Sept. 22, 1931.  G. HARTMANN  1,824,482
METHOD AND APPARATUS FOR MAKING CURVED BODIES
Filed Oct. 9, 1929
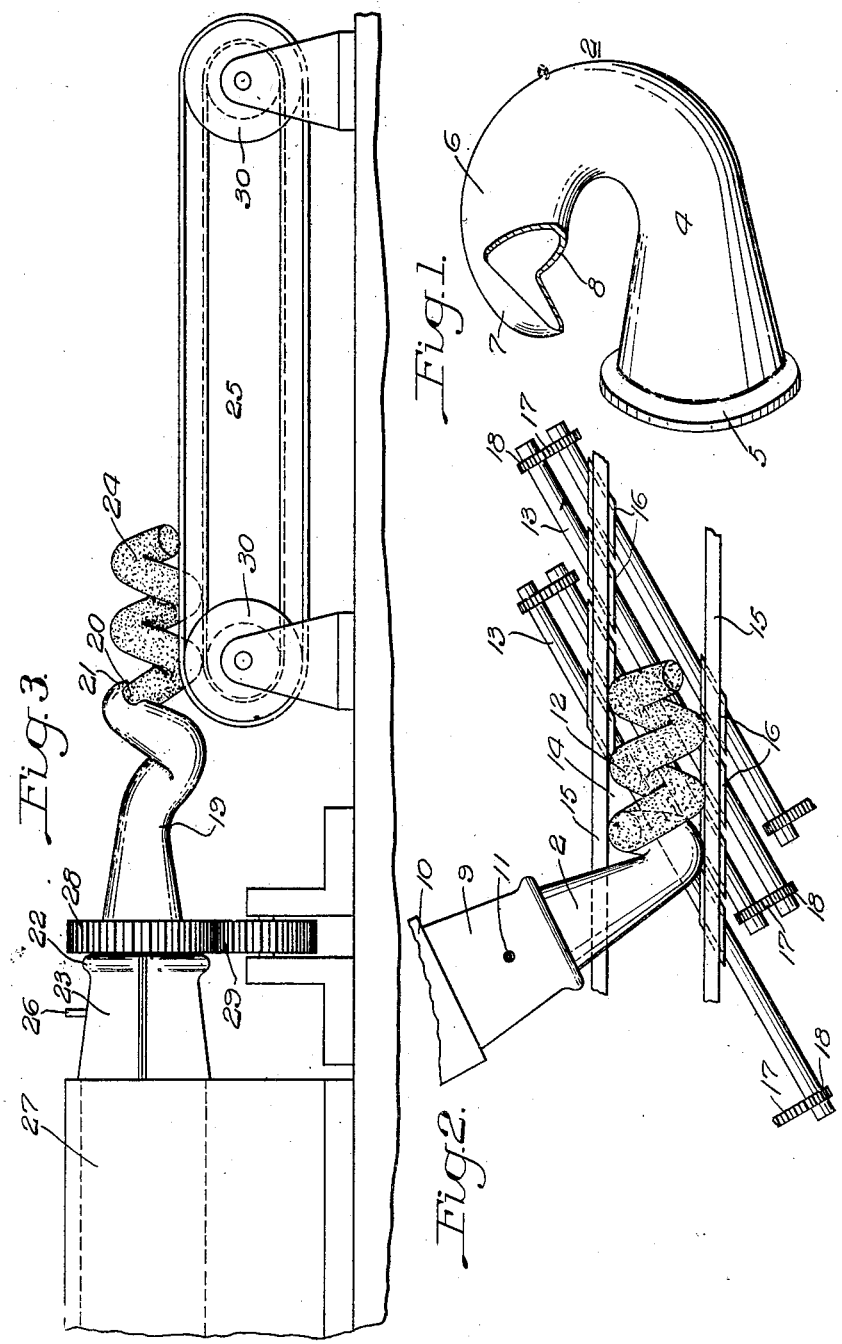
INVENTOR
George Hartmann
by Byrnes, Stebbins & Parmelee
his attorneys.

Patented Sept. 22, 1931

1,824,482

UNITED STATES PATENT OFFICE

GEORG HARTMANN, OF ILSEDER-BEI-PEINE, HANOVER, GERMANY, ASSIGNOR TO THE CHARLES TAYLOR SONS COMPANY, OF CINCINNATI, OHIO, A CORPORATION OF OHIO

METHOD AND APPARATUS FOR MAKING CURVED BODIES

Application filed October 9, 1929. Serial No. 398,362.

My invention relates to methods and apparatus for making curved bodies, and more particularly to a method and apparatus for making helical shapes of ceramic material. Spiral or helical refractory shapes are useful in filling chambers used in chemical or heating processes, such as filling regenerative heat chambers used in connection with furnaces, coking ovens, and the like. The helical or spiral shape of the filling bodies affords ample spaces for the passage of fluids undergoing a heat transfer process without offering any considerable resistance to fluid flow. Such bodies expand and contract readily. Also, the areas of contact between adjacent bodies are small and the tendency for closed pockets to exist between adjacent bodies is eliminated. The presence of closed pockets interfers with the uniform movement of the fluid traversing the mass of curved bodies in the chamber, thereby impairing the efficiency of the heat transfer operation.

I provide a method and apparatus for making curved ceramic bodies in which ceramic material is extruded from a die. The die imparts a helical shape to a continuous body of ceramic material extruded therefrom. The helical body is subdivided into smaller bodies in accordance with the length desired. Where the edges of the die terminate substantially in a single plane, the extruded material assumes a straight line shape regardless of the configuration of the die prior to discharging the material. In order to cause the bodies to assume a curved shape, such as that of a helix, the edges of the die are cut along different planes, preferably the edge of the die on the outside of the curve overhangs the edge on the inside of the curve. The application of pressure to the outside of the ceramic body deflects it away from the overhanging edge and causes it to assume a curved shape. The die may be stationary and the shaped material removed as formed by hand, or by a conveyor imparting a screw motion to it, or the die may be made to rotate for delivering the shaped material to a conveyor on which the shaped body rests substantially without rotation about its longitudinal axis.

The accompanying drawings illustrate certain preferred embodiments of the invention, in which Figure 1 is a face view of a die for forming helically shaped bodies;

Figure 2 is a diagrammatic view of a stationary die in combination with conveying apparatus for removing the helical body as it is extruded from the die;

Figure 3 is a diagrammatic view of a modified form of die for discharging a continuous helically shaped body onto a conveyor.

Referring to Fig. 1, a die 2 for forming a continuous helically shaped body of plastic material, preferably a ceramic material, is provided with a body portion 4, a securing flange 5 and an end portion 6. The body portion 4 and the end portion 6 merge into each other in a curve approaching in shape the loop of a helix. The end 6 faces in the same general direction as the open end of the body 4, although the axis of the end 6 is inclined to the plane of the open end of the body portion 4. An overhanging edge or lip 7 is provided on the outer surface of the die at the end 6. The lip 7 extends considerably ahead of the end surface 8 at the inside of the curve. With this construction material extruded from the die engages the lip 7 after it has passed the edge 8 of the die. Accordingly, the lip 7 applies pressure to the outer surface of the material and deflects it to the inside of the curve, thereby producing a continuous curved body which assumes a generally helical shape. Where the inner and outer edges of the end of the die are in substantially the same plane, the material extruded therefrom assumes a substantially straight shape regardless of the curve and configuration of the die behind the opening. The provision of a curved body portion 4 for the die insures that the material is uniformly packed throughout the die, and that there is slightly more material on the outer edge of the body than on the inner edge, thereby eliminating the possibility of cracking when the extruded material passes under the lip 7.

Referring to Fig. 2, I have illustrated a form of my invention in which a die 2 is mounted on the outer end of a lubricating nose 9 that, in turn, is connected to an auger machine 10. The lubricating nose 9 is provided with a pipe 11 through which a lubricating fluid, such as water or steam, is applied to the ceramic material as it tranverses the lubricating nose 9 in its movement from the auger machine 10 to the die 2. The lubricating nose 9 and the auger machine 10 may be of any preferred type as the details thereof constitute no part of the present invention, except in-so-far as they are necessary to complete the description of the invention herein described and claimed.

A continuous body of ceramic material 12 is extruded from the end of the die 2 and is fed onto a conveyor comprising a plurality of rollers 13 mounted in a frame 14 having side walls 15 which also serve as guides for the extruded material. The rollers 13 are disposed in bearings 16 mounted in the side walls 15 of the frame 14 with their axes substantially normal to the axis of the helical body while engaging them for conveying the body forwardly and rotatably with a screw-like motion as it is extruded from the die 2. The inclination of the rollers 13 to a reference plane passing through the frame 14 is controlled in accordance with the helical pitch of the body 12, so that the body is not distorted during its forward and rotative movement. The rollers 13 are connected by driving chains 17 and sprocket wheels 18. One of the chains 17 is connected to a source of power, such as a motor, not shown. The body 12 may be subdivided into suitable lengths by any cutting means, not shown.

In the modified form of the invention illustrated in Fig. 3, a curved die 19 having an outwardly facing opening 20 and an overhanging lip 21, is rotatably connected with a flange 22 on a lubricating nose 23 for depositing a helical body of ceramic material 24 onto a conveyor 25 without a subsequent rotation of the body 24. The lubricating nose 23 is provided with a pipe 26 through which a lubricating fluid, such as water or steam, is applied to the ceramic material as it traverses the lubricating nose 23 in its movement from an auger machine 27 to the die 19. The rotative movement is given to the die 19 by a gear 28 mounted on the outer surface of the die and meshing with a gear 29 driven by any suitable means, not shown.

The extruded body 24 is fed onto the upper run of the conveyor 25 which travels around pulleys 30, one or both of which may be connected to a driving mechanism, not shown. The speed of the conveyor 25 is controlled in accordance with the helical pitch of the body 24 to prevent the occurrence of breaking strains therein, and the conveyor moves forward the pitch distance of the helical body 24 during each rotation of the die 19. The conveyor 25 is preferably provided with a curved surface corresponding to the shape of the envelope defined by the outer edges of the several convolutions constituting the body 24 for supporting the latter and preventing its rotation while being conveyed.

In this form of invention the rotation of the die 19 completes one loop or convolution of the body 24 during each rotation. As the opening 20 in the die extends forwardly of the die, there is no interference between the previously formed loops of the body and the end of the die. Were the form of die shown in Fig. 1 to be rotated, the previously formed loops of the helical body would engage the body 4 of the die during each rotation of the die and the helical body would be broken.

While I have shown and described certain present preferred embodiments of the invention, it is to be understood that it may be otherwise embodied or practiced within the scope of the appended claims.

I claim:

1. A molding die comprising a spirally curved body portion terminating in an overhanging lip.

2. A molding die comprising a helical body portion terminating in an overhanging lip formed on the outside curved surface thereof.

3. A molding die comprising a spiral body portion for extruding material, the end wall of the body portion on the outside of the curve projecting beyond the end of the wall on the inside of the curve for imparting a curved shape to the material as it leaves the die.

4. A molding die comprising a spirally shaped body portion for extruding material, the end wall of the body portion on the outside of the spiral projecting beyond the end wall on the inside of the spiral for imparting a curved shape to the material as it leaves the die.

5. A molding machine comprising a rotatable die for forming a body of curved material, and means for receiving said body as it is formed by the die, and transporting it from the die.

6. A molding machine comprising a rotatable die for forming a helical body of material, and means for receiving said body as it is formed, and transporting it from the die.

7. A molding machine comprising a die for extruding a helical body of material, and a conveyor comprising means conforming to the shape of the helical body for receiving the body and transporting it from the die.

8. A molding machine comprising a die for extruding a helical body of material, and a conveyor for receiving said body as it is formed and transporting it from the die, the movement of the helical body while on the conveyor being controlled in accordance with its pitch.

9. A molding machine for ceramic materials comprising a curved die, means for imparting rotary movement thereto, and means for preparing and supplying material to the die.

10. A molding machine comprising a curved die terminating in an overhanging lip, means for rotating said die, and an auger machine for supplying material to the die whereby a helical body is formed by material discharged from the die during its rotation.

11. A molding machine comprising a curved die terminating in an overhanging lip, means for rotating the die, an auger machine for supplying material to the die whereby a helical body is formed by material discharged from the die during its rotation, and means for receiving and conveying said helical body, the operation of said conveying means being controlled in accordance with the pitch of said helical body.

12. In the method of forming a helical body of ceramic material, the steps consisting in discharging a body of ceramic material from a die, applying pressure to the material as it is discharged for forming it into a helix, and transporting the formed helical body from the die under conditions dependent upon the pitch of the helical body.

13. In the method of forming helical bodies of ceramic material, the steps consisting in supplying a body of ceramic material, lubricating the body, passing it through a die for forming a helical body, and transporting the helical body from the die while retaining its helical shape.

In testimony whereof I have hereunto set my hand.

GEORG HARTMANN.